(No Model.)
G. W. CROSS.
COAL SCREEN.
No. 526,562. Patented Sept. 25, 1894.
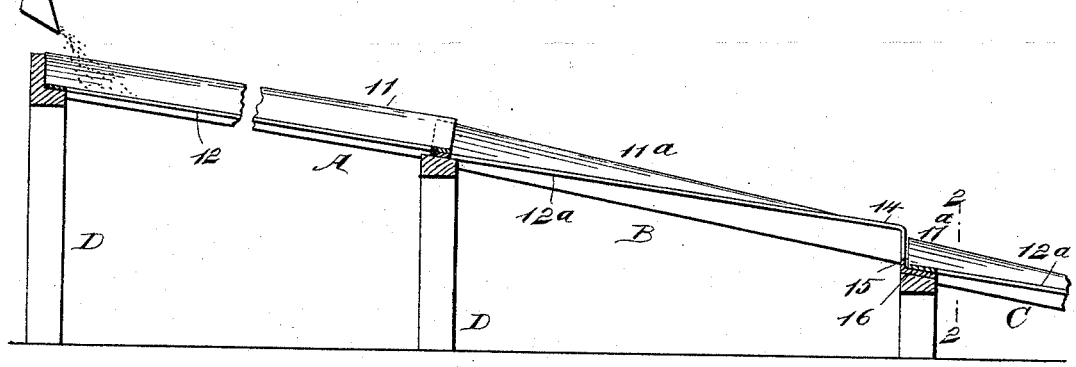
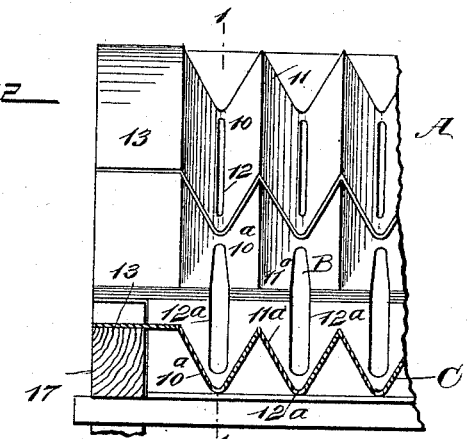
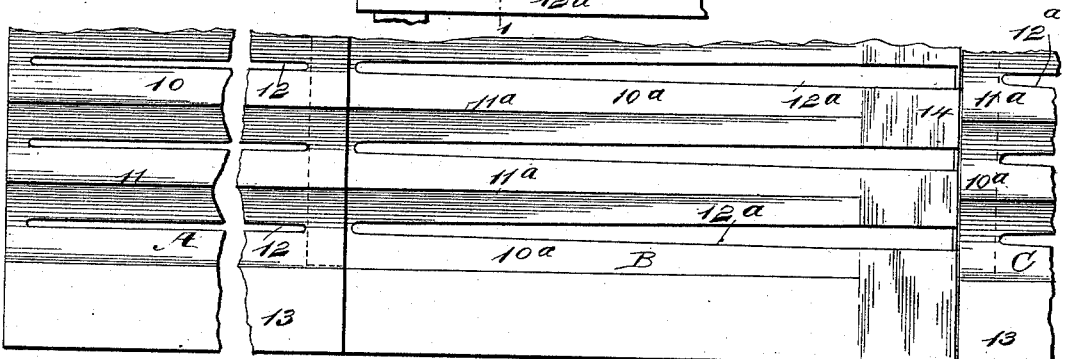
WITNESSES:
H. Walker
C. Sedgwick
INVENTOR
G. W. Cross
BY
Munn & Co.
ATTORNEYS.

UNITED STATES PATENT OFFICE.

GEORGE W. CROSS, OF PITTSTON, PENNSYLVANIA.

COAL-SCREEN.

SPECIFICATION forming part of Letters Patent No. 526,562, dated September 25, 1894.

Application filed March 7, 1894. Serial No. 502,646. (No model.)

*To all whom it may concern:*

Be it known that I, GEORGE W. CROSS, of Pittston, in the county of Luzerne and State of Pennsylvania, have invented a new and Improved Coal-Screen, of which the following is a full, clear, and exact description.

My invention relates to an improvement in coal screens, and it has for its object to provide a screen particularly adapted for picking or separating slate from the coal, the screen being likewise adapted for use in separating the dirt from the coal.

A further object of the invention is to provide a screen of this character, which will be exceedingly simple and economic in its construction and which will tend to separate the flat particles of coal as well as the slate from the mass passed over the screen.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a longitudinal vertical section through the improved screen, the said section being taken practically on the line 1—1 of Fig. 2. Fig. 2 is a vertical transverse section taken on the line 2—2 in Fig. 1, through the lower segment of the screen, looking in direction of the elevated or initial end; and Fig. 3 is a plan view of the screen as illustrated in Fig. 1.

The screen is made up of a series of segments, three being shown in the drawings, designated as A, B, and C. These segments of the screen may be curved to a greater or less extent transversely. They may be more or less flat in plan view, or they may be given any desired or required cross sectional shape. The segments illustrated in the drawings are more or less flat in plan view; that is to say, they are not curved transversely, and the segments may be of any desired length and may be used combinedly or separately.

When used combinedly the upper segment or section A of the screen is provided with a series of longitudinal alternately arranged depressions and ribs, the ribs being of substantially inverted V-shape in cross section, and the depressions or troughs of regular V contour. In other words the side walls of the troughs or depressions 10 in the screen segment diverge at the top and converge at the bottom, while the side walls of the ribs 11 are of reverse construction, diverging at the bottom and converging at the top. The upper or converging edges of the ribs are more or less sharp, while the corresponding portions of the troughs or depressions are not so acutely shaped. The ribs and troughs or depressions in this upper segment or section of the screen are of the same cross section throughout as the cross section of the segment, but a plain flange or border section 13, is usually formed at each side of the segment as shown in Fig. 2, and in the arrangement of the troughs and depressions and the ribs, a trough or depression is located adjacent to each plain side surface 13.

In the bottom of the converging wall of each trough or depression 10 a longitudinal slot 12 is produced, which however, is preferably stopped short of both the upper and lower edges of the segment. This form of segment is particularly adapted to relieve the coal passing over it from dirt or like foreign matter, in order that the coal may pass comparatively clean to the following segments, which are adapted for picking or screening the slate from the coal.

The upper end of each slate-cleaning segment B and C, is formed in identically the same cross sectional shape as the upper or dirt-screening segment A, but the ribs and likewise the channels or troughs in the slate-picking or screening segments diminish as they approach the lower end of the segments, whereas, in the dirt-screening segment or upper one, the ribs and depressions or troughs extend from end to end undiminished.

In the slate-screening segments B and C the troughs and the ribs gradually diminish, and cease altogether or lose themselves in a substantially flat surface 14 near the bottom of the segments at the end of the flat surface 14. Each slate-picking segment is provided with a downwardly-extending wing or flange 15, which is located usually substantially at a right angle to the main body of the segment, and from the lower edge of the flange 15 a horizontal extension or auxiliary flange 16 is formed and which serves as a support for the upper end of next lower or adjoining segment.

The diminishing ribs in the segments B and C are designated as $11^a$ and the troughs as $10^a$, and in the bottom of each trough a longitudinal slot $12^a$ is produced, and these slots extend from a point near the upper end of the slate-picking segments through the plain or straight surface 14, substantially through the downwardly extending flange 15. The slots $12^a$ differ from the slots 12 in the upper section A, inasmuch as the slots $12^a$ are wider than the slots 12, and increase in width as they approach the lower section of the segment in which they are located. The screening segments are supported by framing D of any description, in an inclined position, the upper end of each section or segment being higher than the lower end, and the upper end of one segment is made to rest upon and to receive the lower end of the segment above it, the cross sectional shape of the conducting portions of the segments or sections being the same. The segments may be further supported by attaching the plain or straight sides 13 of the segments to beams 17, or resting said surfaces on said beams, the beams forming a portion of the framing D.

When the coal is to be screened, before screening or picking the slate therefrom, the section A is used as the initial section or segment, and the remaining sections or segments will be constructed with the tapering ribs and troughs and depressions. The coal is delivered to the upper section or segment, and in passing over the same the dirt will fall downward through the slots or perforations in the said segments, and as the cleaned coal and slate approach the upper slate-picking segment, the slate will have been turned upon edge by reason of the inclined walls of the ribs 11 in the upper segment, and will preserve that position upon reaching the picking segments, and the slate, as soon as it reaches a sufficiently wide portion of any of the perforations or slots $12^a$ will drop down through the segment to the ground, and any slate that will be unable to drop through the perforations or slots of the first picking segment will slide over the plain surfaces of the segment and will be scattered thereby over the surface of the segment and will drop either through the apertures or perforations $12^a$ in passing over the flange 15 to the next picking segment, or will find an exit through the perforations or slots in the bottom of the troughs of the latter segment, the slate being made to turn upon edge by the ribs thereof.

It is evident that flat or slab coal will likewise be screened as well as slate.

Having thus described my invention, I claim as new and desire to secure by Letters Patent—

1. In a coal screen, segments or sections provided with longitudinal alternately arranged troughs or depressions and ribs, the said walls of the ribs being converging at their upper edges and the side walls of the troughs converging in a downwardly direction, the troughs being provided in their bottoms with perforations or slots, both the troughs and the ribs gradually diminishing in direction of the lower end of the segments, meeting near said lower end a flat apertured or slotted surface, from which an apertured or slotted flange is projected, substantially as shown and described.

2. The combination, of screens or slate-picking segments, consisting essentially of plates formed with perforations at intervals, the said perforations running longitudinally of the segments, the longitudinal walls of the said perforations being V-shaped upon their working faces, the longitudinal V-shaped walls of the said perforations in the lower segment of the combination being diminished or merged into a flat working face at the lower end of the segment, substantially as and for the purpose specified.

3. The combination, of screens or slate-picking segments consisting essentially of plates formed with perforations at intervals, the said perforations extending longitudinally of the segments, the longitudinal walls of said perforations being V-shaped upon their working faces, the longitudinal V-shaped walls of the said perforations in the lower segment of the combination being flattened and downwardly flanged upon their working faces at the lower end of the said segment, all of the segments of the said combination being adapted for use in combination or separately, as and for the purpose set forth.

4. A screen section having alternate troughs and ribs extended longitudinally and having the troughs diminished gradually in depth toward their lower ends merged at such end in a flat surface and having slots in the bottoms of the troughs, such slots being continued across the flat surface, substantially as set forth.

5. A screen section having longitudinal troughs gradually diminishing in depth from their upper to their lower ends and merging at such ends in a flat surface, substantially as set forth.

6. A screen section formed of a plate of metal formed to provide longitudinal troughs, and at its lower end a vertical wing or flange, and having slots across said flange and along the bottoms of the troughs, substantially as set forth.

7. A screen section composed of a plate formed with longitudinal troughs merged at their lower ends into a substantially flat surface having a vertical wing extended from the lower edge of said flat surface and an extension or flange at the lower edge of said wing and adapted to support the upper end of the next lower section, substantially as set forth.

GEORGE W. CROSS.

Witnesses:
W. M. BERRY,
J. OSCAR SMITH.